(12) United States Patent
Bohannon et al.

(10) Patent No.: US 11,281,854 B2
(45) Date of Patent: Mar. 22, 2022

(54) LIMITING A DICTIONARY USED BY A NATURAL LANGUAGE MODEL TO SUMMARIZE A DOCUMENT

(71) Applicant: Primer Technologies, Inc., San Francisco, CA (US)

(72) Inventors: John Bohannon, San Francisco, CA (US); Oleg Vasilyev, Palo Alto, CA (US); Thomas Alexander Grek, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 133 days.

(21) Appl. No.: 16/678,300

(22) Filed: Nov. 8, 2019

(65) Prior Publication Data

US 2021/0056170 A1 Feb. 25, 2021

Related U.S. Application Data

(60) Provisional application No. 62/889,856, filed on Aug. 21, 2019.

(51) Int. Cl.
*G06F 40/242* (2020.01)
*G06K 9/62* (2006.01)
*G06F 16/332* (2019.01)
*G06F 40/247* (2020.01)
*G06F 40/284* (2020.01)

(52) U.S. Cl.
CPC ........ *G06F 40/242* (2020.01); *G06F 16/3329* (2019.01); *G06F 40/247* (2020.01); *G06F 40/284* (2020.01); *G06K 9/6257* (2013.01)

(58) Field of Classification Search
CPC .... G06F 40/242; G06F 40/247; G06F 40/284; G06F 40/258; G06F 16/3329; G06K 9/6257
See application file for complete search history.

(56) References Cited

U.S. PATENT DOCUMENTS

| | | | | |
|---|---|---|---|---|
| 6,317,708 B1 * | 11/2001 | Witbrock | ............... | G06F 40/35 704/9 |
| 6,766,287 B1 * | 7/2004 | Kupiec | ................. | G06F 40/253 704/9 |
| 6,963,830 B1 * | 11/2005 | Nakao | ................... | G06F 16/345 704/1 |
| 7,272,558 B1 * | 9/2007 | Soucy | ................... | G10L 15/063 704/235 |
| 7,392,262 B1 * | 6/2008 | Alspector | ............... | G06F 16/93 |
| 7,565,372 B2 * | 7/2009 | Zhang | ................... | G06F 16/345 |
| 8,108,398 B2 * | 1/2012 | Guday | ................. | G06F 16/345 707/739 |
| 8,239,358 B1 * | 8/2012 | Soubbotin | ............. | G06F 16/345 707/706 |

(Continued)

*Primary Examiner* — Anne L Thomas-Homescu

(57) ABSTRACT

The technology disclosed herein summarizes a document using a dictionary derived from tokens within the document itself. In a particular implementation, a method provides identifying a first document for summarization and inputting the first document into a natural language model. The natural language model is configured to summarize the first document using words from a first dictionary compiled based on tokens from the first document. The method further provides receiving a first summary output by the natural language model after the natural language model summarizes the first document.

18 Claims, 8 Drawing Sheets

(56) References Cited

U.S. PATENT DOCUMENTS

| | | | |
|---|---|---|---|
| 8,359,531 B2* | 1/2013 | Grandison | G06F 16/345 |
| | | | 715/254 |
| 9,253,208 B1* | 2/2016 | Koshelev | H04L 63/1441 |
| 10,019,525 B1* | 7/2018 | Boni | G06F 16/90332 |
| 10,628,743 B1* | 4/2020 | Kalukin | G06F 16/367 |
| 10,691,897 B1* | 6/2020 | Rajagopal | G06N 3/08 |
| 10,885,436 B1* | 1/2021 | Saleh | G06N 3/084 |
| 2008/0033935 A1* | 2/2008 | Frank | G06F 16/338 |
| 2008/0065685 A1* | 3/2008 | Frank | G06F 16/29 |
| 2008/0301094 A1* | 12/2008 | Zhu | G06F 16/34 |
| 2008/0301095 A1* | 12/2008 | Zhu | G06F 16/951 |
| 2009/0216752 A1* | 8/2009 | Terui | G06F 16/33 |
| 2011/0289080 A1* | 11/2011 | Murdock | G06F 16/3328 |
| | | | 707/728 |
| 2012/0056901 A1* | 3/2012 | Sankarasubramaniam | G06F 3/017 |
| | | | 345/660 |
| 2013/0151538 A1* | 6/2013 | Dmitriev | G06F 16/313 |
| | | | 707/750 |
| 2014/0229159 A1* | 8/2014 | Branton | G06F 16/345 |
| | | | 704/9 |
| 2014/0280008 A1* | 9/2014 | Boudreau | G06F 16/367 |
| | | | 707/708 |
| 2014/0344195 A1* | 11/2014 | Drew | G06N 5/04 |
| | | | 706/12 |
| 2015/0331945 A1* | 11/2015 | Lytkin | H04L 67/02 |
| | | | 707/722 |
| 2016/0232630 A1* | 8/2016 | Admon | G06F 16/345 |
| 2016/0321468 A1* | 11/2016 | Stankiewicz | G06F 21/6254 |
| 2017/0068654 A1* | 3/2017 | Jeong | G06F 16/313 |
| 2017/0161372 A1* | 6/2017 | Fernández et al. | G06F 40/268 |
| 2017/0228369 A1* | 8/2017 | Zelenkov | G06F 40/30 |
| 2017/0228457 A1* | 8/2017 | Billawal | G06F 40/284 |
| 2017/0364587 A1* | 12/2017 | Krishnamurthy | G06F 40/284 |
| 2018/0350232 A1* | 12/2018 | Pietrobon | G06Q 10/04 |
| 2019/0042551 A1* | 2/2019 | Hwang | G06N 3/0454 |
| 2019/0163786 A1* | 5/2019 | Bansal | G06F 16/24578 |
| 2019/0266236 A1* | 8/2019 | Battach | G06N 3/10 |
| 2019/0325084 A1* | 10/2019 | Peng | G06F 16/9535 |
| 2019/0349321 A1* | 11/2019 | Cai | G06F 40/237 |
| 2019/0362020 A1* | 11/2019 | Paulus | G06N 3/04 |
| 2020/0012728 A1* | 1/2020 | Jan | G06K 9/00449 |
| 2020/0081909 A1* | 3/2020 | Li | G06F 16/345 |
| 2020/0134091 A1* | 4/2020 | Feigenblat | G06F 16/93 |
| 2020/0159755 A1* | 5/2020 | Iida | G06F 16/20 |
| 2020/0175229 A1* | 6/2020 | Iwakura | G06F 16/345 |
| 2020/0184012 A1* | 6/2020 | Stoyanovsky | G06F 40/284 |
| 2020/0210521 A1* | 7/2020 | Hutchins | G06F 16/986 |
| 2020/0226206 A1* | 7/2020 | Brake | G06F 40/284 |
| 2020/0311344 A1* | 10/2020 | Tripathi | G06F 40/284 |
| 2020/0334302 A1* | 10/2020 | Kussmaul | G06F 11/3688 |
| 2020/0341990 A1* | 10/2020 | Rosenoff | G06F 16/252 |
| 2020/0364463 A1* | 11/2020 | Pooja | G06K 9/00751 |
| 2020/0402098 A1* | 12/2020 | Bent, III | G06F 16/41 |
| 2021/0011937 A1* | 1/2021 | Boni | G06F 40/258 |
| 2021/0089605 A1* | 3/2021 | Xu | G06F 16/9538 |
| 2021/0103256 A1* | 4/2021 | Jia | G05B 13/0265 |
| 2021/0117617 A1* | 4/2021 | Blaya | G06F 40/253 |

\* cited by examiner

LIMITING A DICTIONARY USED BY A NATURAL LANGUAGE MODEL TO SUMMARIZE A DOCUMENT

RELATED APPLICATIONS

This application is related to and claims priority to U.S. Provisional Patent Application 62/889,856, titled "Headline Generation: Learning from Decomposed Sentences," filed Aug. 21, 2019, and which is hereby incorporated by reference in its entirety.

TECHNICAL BACKGROUND

Natural language models can be used by computing systems to automatically generate sentences that can, hopefully, be understood by a human. Various frameworks, such as Bidirectional Encoder Representations from Transformers (BERT), can be used to train a natural language model to generate a desired text. For example, a natural language model may be trained to automatically generate an article after being provided with facts for inclusion in that article. In another example, a natural language model may be trained to automatically generate a fictional story after being provided with basic parameters for that story (e.g., characters, general setting, etc.). Essentially, training a natural language model teaches the natural language model how to select and order words, punctuation, etc. in a manner that results in a work that can be comprehended by a human and mimics the desired output format (e.g., the article or fictional story from above). Given the numerous words and variations of those words in any given language, training a natural language model to choose and order those words can be exceedingly difficult.

Overview

The technology disclosed herein summarizes a document using a dictionary derived from tokens within the document itself. In a particular implementation, a method provides identifying a first document for summarization and inputting the first document into a natural language model. The natural language model is configured to summarize the first document using words from a first dictionary compiled based on tokens from the first document. The method further provides receiving a first summary output by the natural language model after the natural language model summarizes the first document.

In some embodiments, the tokens comprise complete words and the first dictionary compiled based on the tokens comprises a dictionary that includes only the words in the first document.

In some embodiments, the tokens comprise strings of characters of minimum length while still having meaning to the natural language model and the first dictionary compiled based on the tokens comprises a dictionary that includes only words that can be derived from the tokens.

In some embodiments, the words that can be derived from the tokens include the words in the first document, alternative forms of the words in the first documents, synonyms of the words in the first document, and aphorisms of the words in the first document.

In some embodiments, the method further includes obtaining a plurality of documents, each including a respective summary thereof. For each respective document of the plurality of documents, the method provides finding a longest substring, wherein the longest substring starts at the beginning of the respective summary, in a plurality of substrings that comprise the respective summary of the respective document that is also found elsewhere in the respective document. Until the end of the respective summary is reached, the method provides iteratively finding a next longest substring in the respective summary that is also found elsewhere in the respective document, wherein the next longest substring occurs in the respective document immediately after the preceding substring in the respective summary. Upon finding the longest substring and each of the next longest, the method provides adding the respective document to a plurality of training documents in association with the respective summary. The method then provides using the plurality of training documents to train a natural language model.

In some embodiments, each of the plurality of sub strings include complete words from the summary.

In some embodiments, using the plurality of training documents to train the natural language model includes inputting a first training document of the plurality of training documents into the natural language model and indicating to the natural language model that an answer to a blank first question is the longest substring in a summary of the first training document and adding the longest substring to a next question. Until the end of the summary of the first training document is reached, the method includes iteratively indicating to the natural language model that an answer to the next question is the next longest substring in the summary of the first training document and adding the next longest substring to the next question.

In some embodiments, the end of the summary of the first training document is reached, the answer to the next question is a special character.

In some embodiments, the method includes, after using the plurality of training documents to train the natural language model, instructing the natural language model to summarize the first document by providing the natural language model with a blank second question.

In some embodiments, the first summary comprises a title for the first document.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to identify a first document for summarization and input the first document into a natural language model. The natural language model is configured to summarize the first document using words from a first dictionary compiled based on tokens from the first document and receive a first summary output by the natural language model after the natural language model summarizes the first document.

DETAILED DESCRIPTION

Natural language models can be trained to produce arrangements of words, such as sentences, paragraphs, articles, etc., that a human reader can comprehend. A natural language model used herein is trained to summarize a document. The summary may be as short as a few words, as may be the case with a title, or may be much longer (e.g., many paragraphs) depending on the length of the document being summarized and the desired length of that summary. The summary system described below summarizes documents my limiting which words the natural language model can use when creating summaries of those documents. In particular, the natural language model is limited to words stemming from those in the document being summarized. By using words from the document itself, it is less likely that the natural language model will include words in the summary that are not actually relevant to the document. Likewise, limiting the words available to the natural language model further reduces the processing resources that may otherwise be needed when having a larger amount of words to select from.

Figure 1:
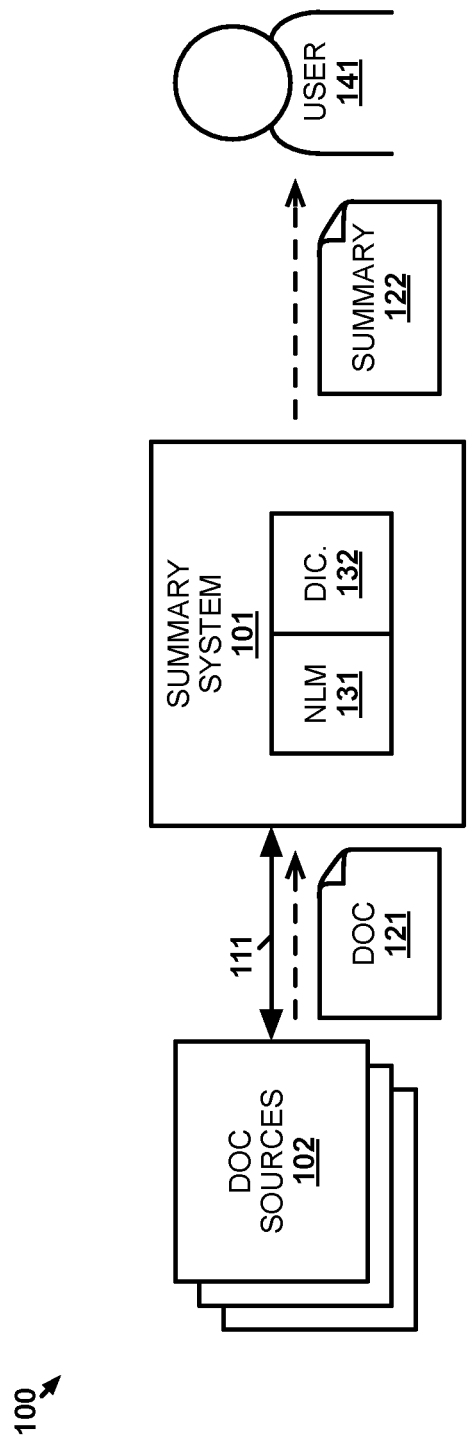
FIG. 1 illustrates a computing environment for summarizing a document using a natural language model with a limited dictionary.

FIG. 1 illustrates computing environment 100 for summarizing a document using a natural language model with a limited dictionary. Computing environment 100 includes summary system 101 and document sources 102. Summary system 101 and document sources 102 communicate over communication link(s) 111. Communication link(s) 111 may be direct data links to document sources 102 or may include intervening systems, networks, and devices, such as the internet or local area networks.

Document sources 102 are computing systems that maintain and provide documents, such as text articles, transcripts of audio/video media (e.g., television show, radio show, podcast, etc.), books, or some other type of language based content that can be summarized. For example, a document source in document sources 102 may be a news media website that provides a news article (i.e., document) about an event that recently occurred. Documents that are not natively text based (e.g., video media) may be converted to text for summarization through a speech recognition mechanism in summary system 101 or may be converted by some other system/user prior to being provided to summary system 101. Documents for summarization are retrieved from document sources 102 either automatically or at the request of user 141. For example, summary system 101 may be configured to find and summarize all documents related to a particular topic or user 141 may indicate a particular document for which user 141 desires a summary. While this example focuses on documents provided by document sources 102, some examples of summary system 101 may summarize documents already stored at summary system 101. For instance, if summary system 101 is implemented in a personal computer for user 141, user 141 may type a document into summary system 101 and then instruct summary system 101 to summarize that document.

Figure 2:
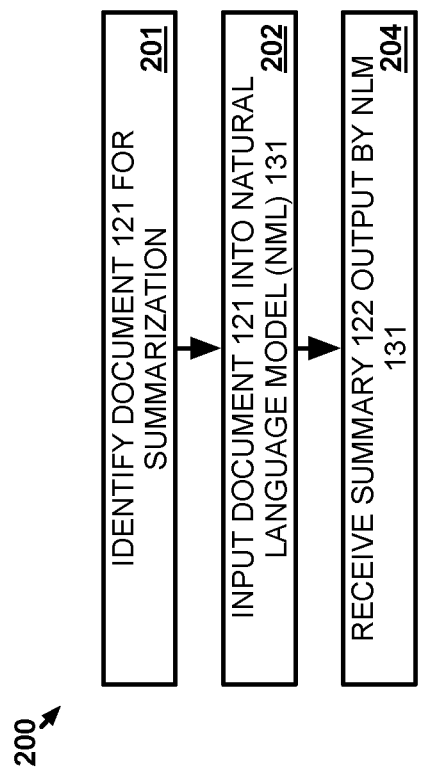
FIG. 2 illustrates an operation for summarizing a document using a natural language model with a limited dictionary.

FIG. 2 illustrates operation 200 for summarizing a document using a natural language model with a limited dictionary. Summary system 101 identifies document 121 for summarization (201). Summary system 101 may identify document 121 by user 141 explicitly identifying document 121 for summarization via user input into summary system 101 or a user system in communication with summary system 101, by one of document sources 102 pushing document 121 to summary system 101 for summarization, by a system other than one of document sources 102 instructing summary system 101 to obtain document 121, or some other manner in which document may be identified to summary system 101.

Once identified and obtained (e.g., downloaded from one of document sources 102), summary system 101 inputs document 121 into natural language model 131 (202). In this example, natural language model 131 has been trained to summarize documents input thereto. In particular, natural language model 131 is configured to summarize the first document using words from dictionary 132 compiled based on tokens from document 121. In some cases, dictionary 132 may be explicitly created before natural language model 131 summarizes document 121 so that natural language model 131 can select from words in natural language model 131. In other cases, dictionary 132 is never explicitly created but merely represents the fact that natural language model 131 selects words from tokens included in document 121. Dictionary 132 may comprise only words explicitly contained within document 121 or may also include variations thereof. For example, even if document 121 only includes the word "go" dictionary 132 may also include "going", "gone", and "went". Dictionary 132 may also allow for pronouns to be used in place of names, synonyms of words in document 121, or aphorisms that capture basic concepts from within document 121 (e.g., using "the President" rather than the President's name). Other alternatives to explicitly recited words may also be used while keeping dictionary 132 to a more manageable size. Using alternatives to words explicitly recited in document 121 may allow natural language model 131 to generate a more naturally worded summary than could otherwise be created. For example, words that were appropriate to the author of document 121 as part of the longer text may not fit well when rephrased into a summary thereof.

In some cases, a token may comprise an entire word (e.g., in short words like "a", "I", "can", etc.). In more complex examples, a token comprises a character, or string of characters, that has a minimal amount of meaning to natural language model 131. For example, in the word "driving" both the "driv" and the "ing" component may have meaning to natural language model 131. Specifically, "driv" indicates to natural language model 131 that the root word is "drive" and "ing" indicates the verb form of that root word. Other substrings within the word "driving" would have no meaning to natural language model 131 (or language parsing in general). Using tokens that can be more granular than entire words allows natural language model 131 to be trained on those more granular components, which may increase flexibility of natural language model 131 to generate a proper summary.

After natural language model 131 processes document 121, summary system 101 receives summary 122 output by natural language model 131 (203). Summary 122 may be presented to user 141 upon completion or may be stored internally to summary system 101, in another storage system, or may be sent back to one of document sources 102 for storage. In some cases, summary system 101 may edit document 121 or edit a copy of document 121 to include summary 122. For instance, summary 122 is to be used as a title or abstract for document 121 then summary system 101 may insert summary 122 in the appropriate place within document 121 for a title or abstract. In some examples, summary system 101 may include a user interface that presents summary 122 to user 141 or summary system 101 may transfer summary 122 to a user system operated by user 141 for presentation to user 141.

Figure 3:
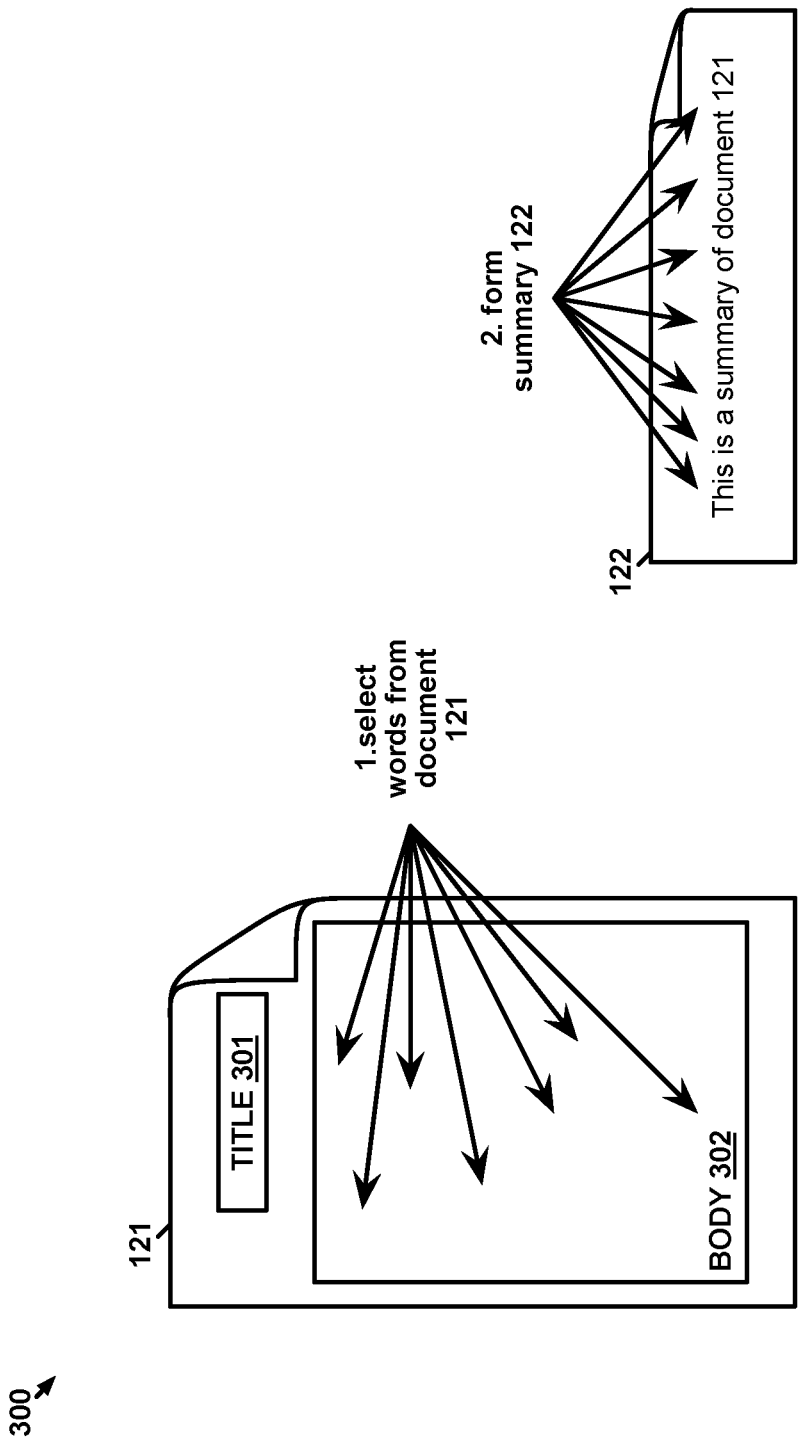
FIG. 3 illustrates an operational scenario for summarizing a document using a natural language model with a limited dictionary.

FIG. 3 illustrates operational scenario 300 for summarizing a document using a natural language model with a limited dictionary. In operational scenario 300, document 121 is shown as having document title 301 and document body 302. Document body 302 contains the bulk of the information to be summarized although, summary system 101 may draw from document title 301 as well. Operational scenario 300 further illustrates a portion of summary system 101 performing operation 200. Specifically, natural language model 131 is trained to select certain words from document 121 at step 1. Those selected words are then arranged with appropriate punctuation, which may also be identified from within document 121, to form summary 122 at step 2. In some examples, natural language model 131 may be configured to select strings of words rather than individual words, which allows natural language model 131 to avoid having to arrange those words that are already in a string.

Figure 4:
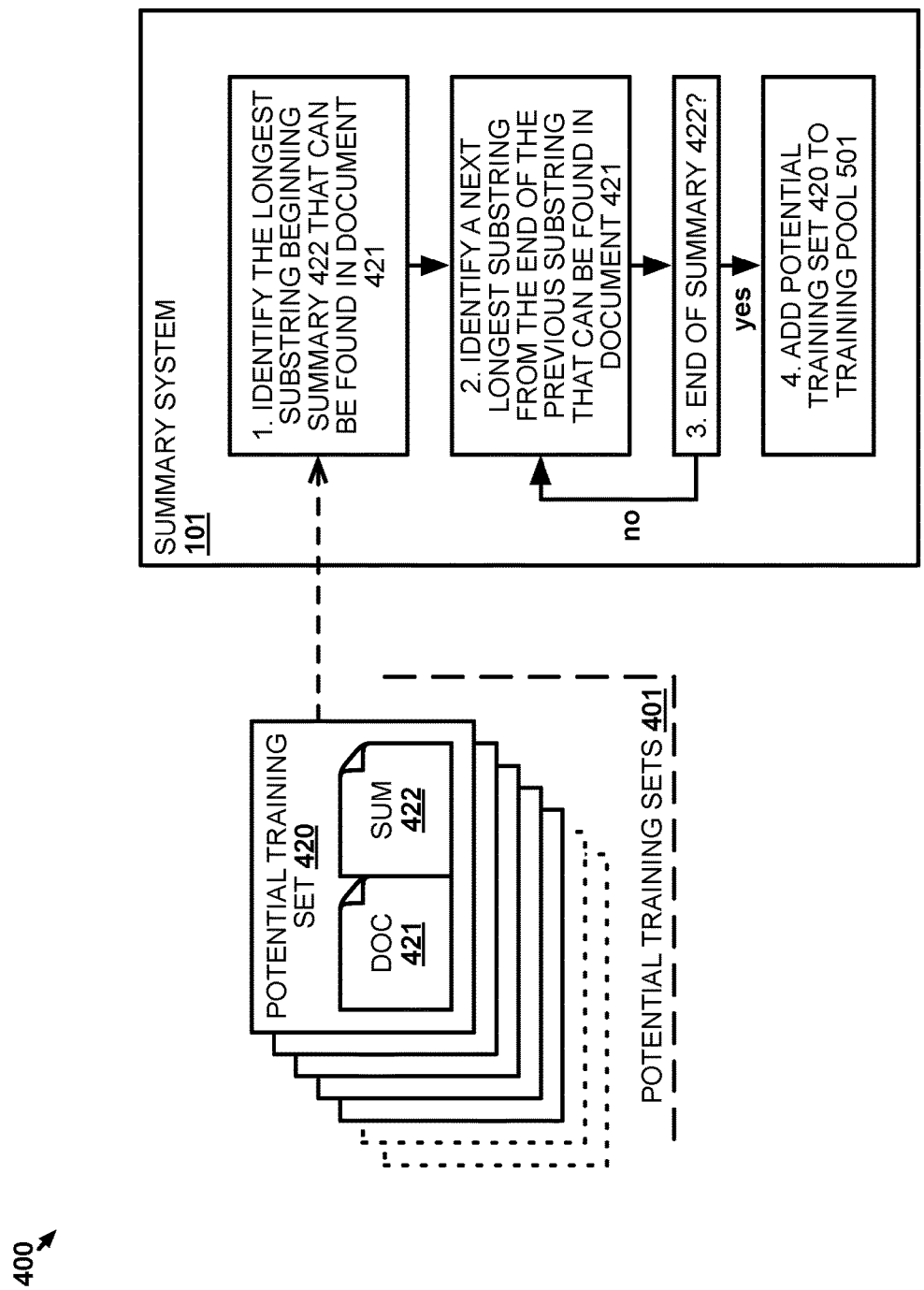
FIG. 4 illustrates another operational scenario for summarizing a document using a natural language model with a limited dictionary.

FIG. 4 illustrates operational scenario 400 for summarizing a document using a natural language model with a limited dictionary. In operational scenario 400, summary system 101 selects potential training sets from potential training sets 401 to use when training natural language model 131 to summarize documents. Each potential training set includes a document and a summary of that document. Preferably the summary of the document is a summary that was generated by a human, reviewed by a human, or generated by a trusted other natural language model to ensure natural language model 131 will not be trained using a summary that includes traits that are not desirable for summaries generated using natural language model 131 (e.g., summaries that include inaccuracies, poor grammar, etc.). The potential training sets in potential training sets 401 may be obtained from document sources 102 or may be obtained from some other source.

An example potential training set 420 of potential training sets 401 includes document 421 and summary 422. In this example, document 421 and summary 422 are shown as being distinct elements (e.g., may be separate files or separate elements within a single file), although, in some examples, summary 422 may be incorporated into document 421. For instance, summary 422 may be an abstract or title of document 421 or may be including within document 421 in some other manner. If summary 422 is included within document 421, then document 421 may include an indicator for summary system 101 to identify summary 422 within document 421 (e.g., a section header identifying the summary section). Potential training sets 401 may be processed in batches or may be processed as they come in (e.g., processed whenever a new potential training set is identified for processing).

Operational scenario 400 covers the processing of potential training set 420 to determine that potential training set 420 should be included in training pool 501 for natural language model 131. At step 1, summary system 101 identifies a first longest substring that begins summary 422 and can also be found in document 421. In other words, summary system 101 keeps adding sequential elements from the beginning of summary 422 to the first longest substring until additional elements would result in a first longest substring that cannot be found in document 421. If no elements are able to form a first longest substring that can be found within document 421, then potential training set 420 is not included in training pool 501. In this example, the first longest substring is found in document 421 and summary system 101 moves onto identifying a next longest substring of summary 422 that can also be found in document 421, which begins immediately after the first longest substring in summary 422, at step 3. In other words, summary system 101 keeps adding sequential elements, beginning immediately after the end of the previously found longest substring, to the next longest substring until additional elements would result in a next longest substring that cannot be found in document 421. If no elements are able to form a next longest substring that can be found within document 421, then potential training set 420 is not included in training pool 501.

If the next longest substring from above is not at the end of summary 422, then steps 3 and 4 repeat in order to identify the longest substring that comes next in summary 422 (i.e., immediately following the previously identified next substring in summary 422) and can also be found in document 421. If all substrings of summary 422 are found in summary 422 through steps 1-3, including all iterations of steps 2 and 3, then potential training set 420 is added to training pool 501. If other potential training sets need to be processed in a manner similar to potential training set 420 above, then summary system 101 may process those other potential training sets sequentially or may process at least some of them in parallel.

Figure 5:
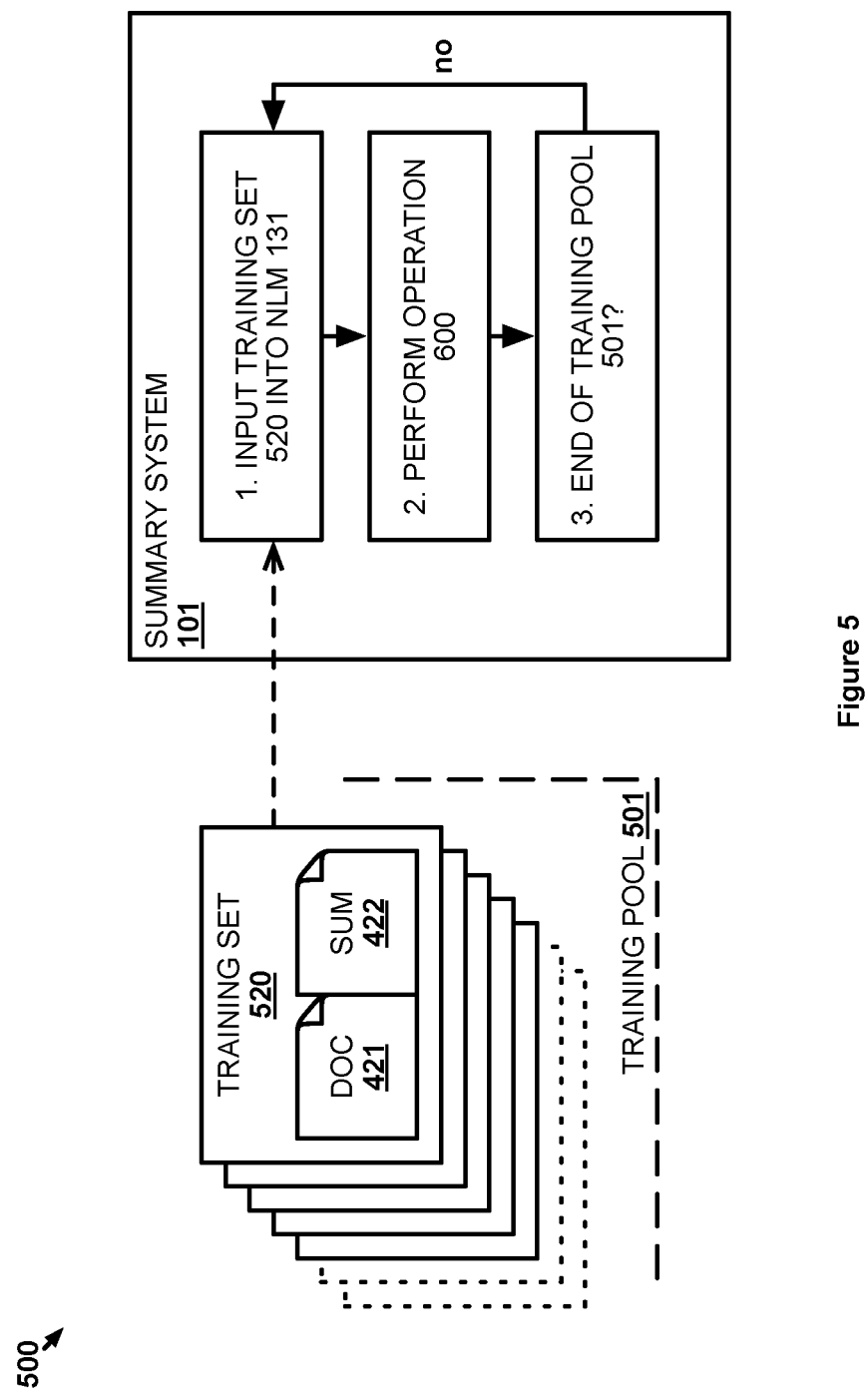
FIG. 5 illustrates another operational scenario for summarizing a document using a natural language model with a limited dictionary.

FIG. 5 illustrates operational scenario 500 for summarizing a document using a natural language model with a limited dictionary. In operational scenario 500, summary system 101 trains natural language model 131 using the training sets in training pool 501. As can be inferred from operational scenario 400, the training sets in training pool 501 requires the strings identified in a summary to also be in the corresponding document because that is how natural language model 131 will learn to select strings from future documents being summarized. That is, by learning which other strings from a document were selected for a summary of a training set, natural language model 131 can select strings from the future documents that have similar qualities.

An example training set used to train natural language model 131 is training set 520. Training set 520 includes document 421 and summary 422 since training set 520 is simply potential training set 420 after summary system 101 has placed potential training set 420 into training pool 501. To train natural language model 131, summary system 101 inputs training set 520 into natural language model 131 at step 1. Summary system 101 then performs operation 600 on training set 520, which is detailed below, at step 2. After performing operation 600, summary system 101 determines at step 3 whether the end of training pool 501 has been reached. If not, summary system 101 returns to step 1 where another training set in training pool 501 is input into natural language model 131 for training.

Figure 6:
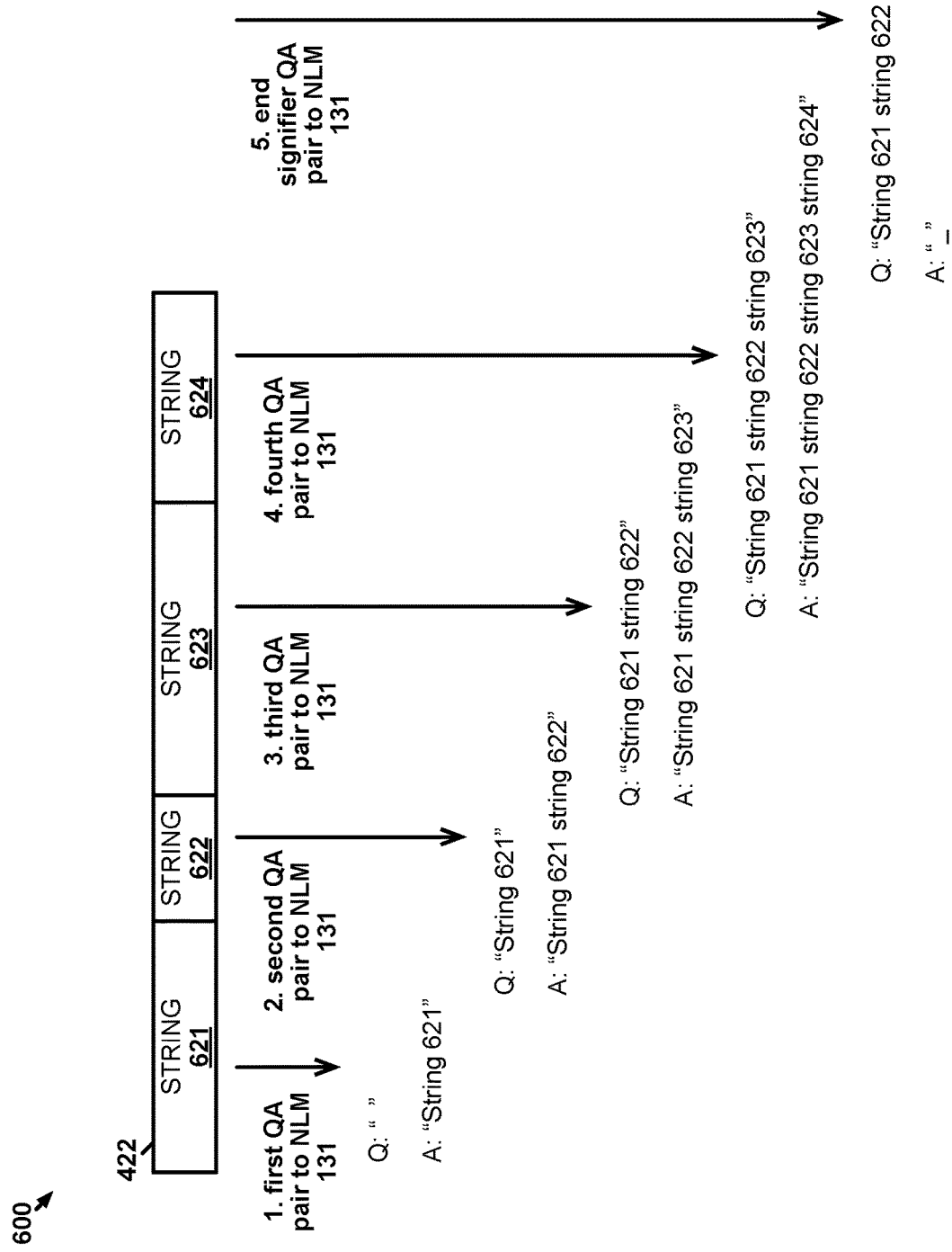
FIG. 6 illustrates an operation for summarizing a document using a natural language model with a limited dictionary.

FIG. 6 illustrates operation 600 for summarizing a document using a natural language model with a limited dictionary. In operation 600, natural language model 131 is a question/answer (QA) model whereby natural language model 131 learns how questions should be answered from text within a document. The questions and answers for training natural language model 131 are constructed from feeding strings of a training summary into natural language model 131. The strings fed into natural language model 131 correspond to the substrings identified in operational scenario 400. For this example, summary 422 was found to have four substrings in operational scenario 400, which are represented in operation 600 as string 621, string 622, string 623, and string 624, respectively.

Operation 600 starts at step 1 with summary system 101 indicating to natural language model 131 a first blank question and string 621 as the answer to that blank question. Summary system 101 then indicates to natural language model 131 at step 2 that the answer to the first question is a second question with the answer to that second question being string 622 added to the end of string 621. Summary system 101 then indicates to natural language model 131 at step 3 that the answer to the second question is a third question with the answer to that third question being string 623 added to the end of string 621 and string 622. Summary system 101 then indicates to natural language model 131 at step 4 that the answer to the third question is a fourth question with the answer to that fourth question being string 624 added to the end of string 621, string 622, and string 623. Since string 624 is the last string in summary 422, summary system 101 then indicates to natural language model 131 at step 5 that the answer to the fourth question is a fifth question with the answer to that fifth question being a special character. In this case, the special character is "_", although other characters (or string of characters) may be used to designate the end of the summary.

During operation 600, natural language model 131 learns how questions should be answered based on strings found within a document. If document 421 was the only document used to teach natural language model 131, then natural language model 131 would learn to always look for string 621 in a document as an answer to the first blank question. However, document 421 is not the only document used to train natural language model 131. As such, natural language model 131 will have a larger sample of answers to the blank question and can determine similarities between those answers so that natural language model 131 can find an answer having similar characteristics to those other answers in a new document for summarization (e.g., document 121). Natural language model 131 will similarly learn from the answers to subsequent questions with the answers to subsequent questions also being based on the answers to previous questions due to the strings being added to previously found strings in the answers. The more training sets used to train natural language model 131, the better natural language model 131 will be at recognizing answers.

The special character above is added to the end of every document in training pool 501 so that natural language model 131 can easily recognize the end of a document. In other examples, natural language model 131 may recognize the end of a document in some other manner. While summary 422 included only four strings for training natural language model 131, other training sets may include summaries having more or fewer strings. Natural language model 131 will learn from documents in training pool 501 when the special character should be returned as the answer to a question (i.e., it will not necessarily be returned after four strings). Therefore, natural language model 131 will further learn when a summary of a document is complete and the special character should be returned at the end of the document.

Figure 7:
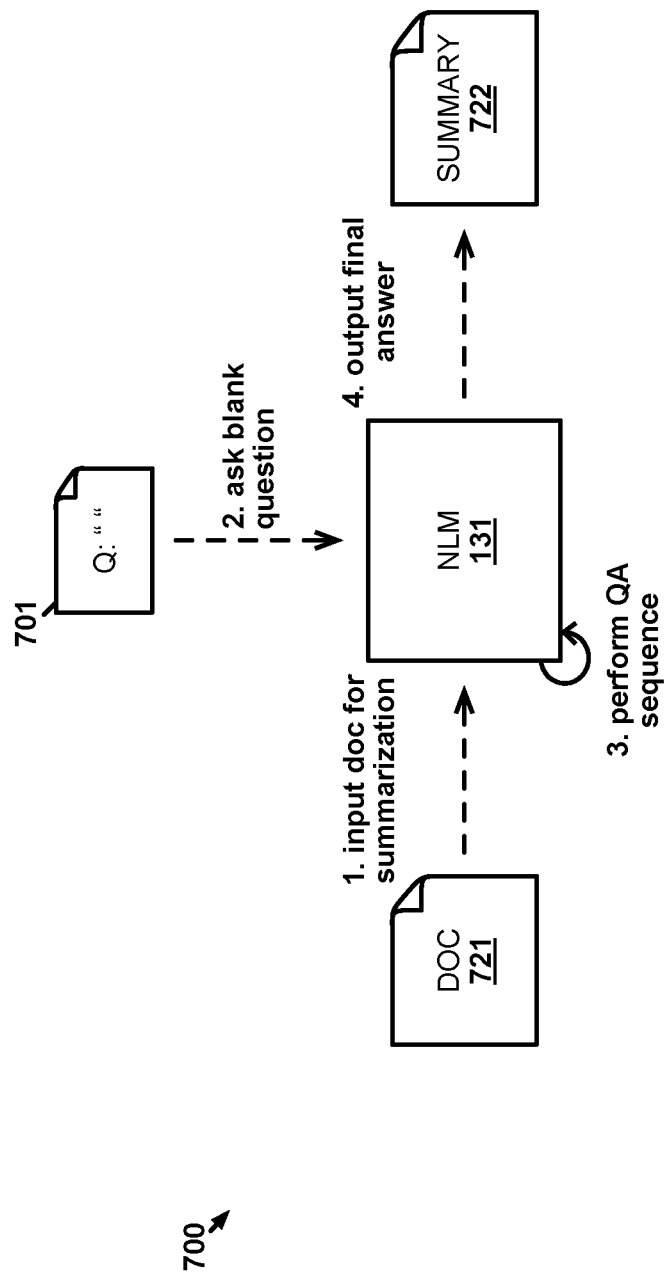
FIG. 7 illustrates another operational scenario for summarizing a document using a natural language model with a limited dictionary.

FIG. 7 illustrates operational scenario 700 for summarizing a document using a natural language model with a limited dictionary. Operational scenario 700 describes the summarization of document 721 after natural language model 131 has been trained in accordance with the above examples. In this example, document 721 is fed at step 1 into natural language model 131 by summary system 101. Before being fed to natural language model 131, the special character discussed above is added to the end of document 721. To trigger natural language model 131 to summarize document 721, blank question 701 is asked to natural language model 131 at step 2. Responsive to blank question 701, natural language model 131 answers blank question 701 and iteratively is asked new questions at step 3 that comprise the answers to previous questions appended to one another like the strings in operation 600. Once natural language model 131 has determined that the end of summary 722, natural language model 131 answers a question with the special character.

The questions subsequent to blank question 701 may be asked by natural language model 131 itself until natural language model 131 recognized the special character or summary system 101 may ask the subsequent questions until natural language model 131 returns the special character. For instance, natural language model 131 may return the answer to blank question 701 to summary system 101 and summary system 101 may use that answer as the next question to natural language model 131. When a next answer is returned and the next answer is not the special character, then summary system 101 uses that next answer as the next question to natural language model 131, and so on until natural language model 131 returns the special character. Once summary system 101 recognizes the special character returned from natural language model 131, then summary system 101 knows that the question resulting in that special character answer is the summary 722 output by natural language model 131 at step 4. In some examples, summary 722 will already include a period when output from natural language model 131 or the period may be appended to the end of summary 722 by summary system 101.

For ease of comprehension, the above examples train natural language model 131 based on relatively short summaries (e.g., the one sentence of summary 122 from operational scenario 300). These short summaries may be titles of the training documents and summaries generated for a summarized document, such as summary 722, may be a title for use in document 721. In other examples, natural language model 131 may be trained for longer summaries, such as those one or more paragraphs in length. In those examples, the training sets in training pool 501 would include summaries of roughly the desired length. Summary system 101 may maintain different versions of natural language model 131 that are trained for summaries of different lengths. User 141 may then, for example, indicate to summary system 101 a desired length for a summary of a document and summary system 101 will responsively feed the document into the corresponding version of natural language model 131 for that length.

Alternatively, summary system 101 may generate a longer summary by putting together multiple shorter summaries generated by natural language model 131. Using document 721 as an example, summary system 101 may split document 721 into document segments with each segment being a sequential portion of document 721. For instance, depending on the length of document 721 and/or a desired length of summary 722, summary system 101 may split document 721 into a grouping of paragraphs (e.g., four paragraphs per segment), a group of pages (e.g. 2 pages per segment), a group of chapters or sections (e.g., one chapter per segment), or some other way in which a document can be segmented.

Each segment would then be fed into natural language model 131 as an independent document producing a summary. Summary system 101 would then put those summaries together end to end in the same order in which their corresponding segments were taken from document 721 to generate a finalized summary 722. For example, if document 721 was a novel containing 15 chapters and summary system 101 used each chapter as a segment to feed into natural language model 131, natural language model 131 would output 15 respective summaries. Those 15 summaries would be put together in order (i.e., in the order of chapters 1-15 from which they were derived) to create summary 722 as a 15 sentence paragraph.

Figure 8:
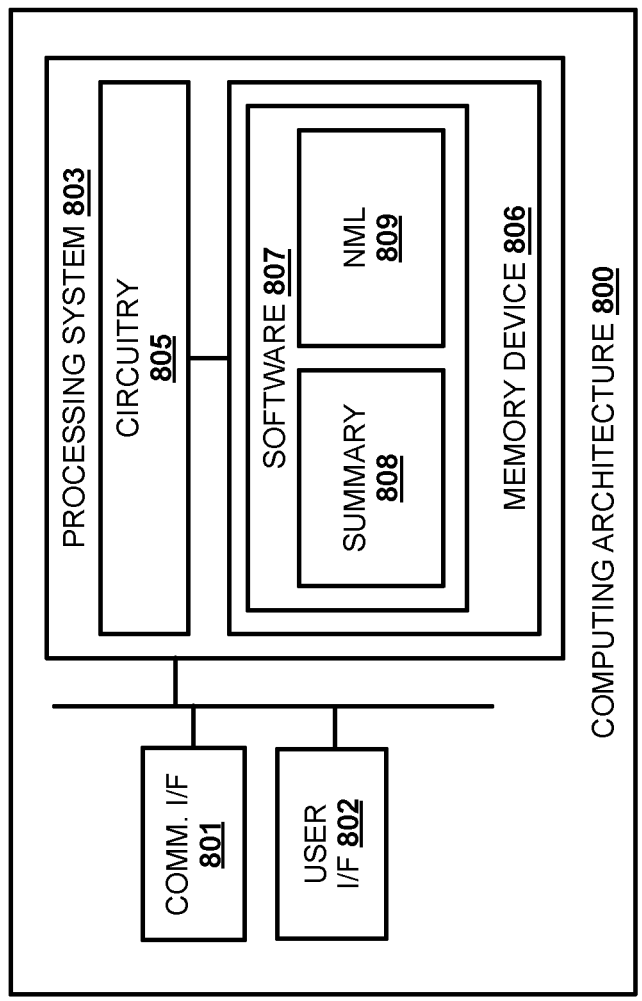
FIG. 8 illustrates a computing architecture for summarizing a document using a natural language model with a limited dictionary.

FIG. 8 illustrates computing architecture 800 for summarizing a document using a natural language model with a limited dictionary. Computing architecture 800 is representative of any computing system or systems with which the various operational architectures, processes, scenarios, and sequences disclosed herein may be implemented. Computing architecture 800 is an example of summary system 101, although other examples may exist. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807. Computing architecture 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, communication interface 801 may be configured to communicate with information and supplemental resources to obtain objects for defining events. Communication interface 801 may further be configured to communicate with client or console devices of end users, wherein the users may request and receive summaries from computing system User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples. In some implementations, user interface 802 may be used in obtaining user summary requests and providing the summary to the requesting user.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes summarization module 808 and natural language model 809, although any number of software modules may provide the same operation. Operating software 807 may further include an operating system, utilities, drivers, network interfaces, applications, or some other type of software. When executed by processing circuitry 805, operating software 807 directs processing system 803 to operate computing architecture 800 as described herein.

In one implementation, summarization module 808 directs processing system 803 to identify a first document for summarization and input the first document into natural language model 809. Natural language model 809 is configured to summarize the first document using words from a first dictionary compiled based on tokens from the first document. Summarization module 808 further directs processing system 803 to receive a first summary output by natural language model 809 after natural language model 809 summarizes the first document.

Returning to the elements of FIG. 1, document sources 102 may comprise websites and/or databases capable of providing news stories, articles, electronic books, text transcripts of audio (either take from a video or strictly audio source), or some other type of document having text for summarization. Document sources 102 may comprise one or more communication interfaces and network interfaces, processing systems, computer systems, microprocessors, storage systems, storage media, or some other processing devices or software systems. Document sources 102 may comprise one or more serving computing systems, desktop computing systems, or some other similar computing system.

Summary system 101 comprise communication interfaces and network interfaces, processing systems, computer systems, microprocessors, storage systems, storage media, or some other processing devices or software systems, and can be distributed among multiple devices. Summary system 101 may include software such as an operating system, logs, databases, utilities, drivers, networking software, and other software stored on a computer-readable medium.

Communication between the summary system 101 and document sources 102 may use metal, glass, optical, air, space, or some other material as the transport media. Communication link 111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 111 may be a direct link or may include intermediate networks, systems, or devices, and may include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for summarizing documents, the method comprising:
    obtaining a plurality of documents, each including a respective summary thereof, and for each respective document of the plurality of documents:
        finding a longest substring, wherein the longest substring starts at the beginning of the respective summary, in a plurality of substrings that comprise the respective summary of the respective document that is also found elsewhere in the respective document;
        until the end of the respective summary is reached, iteratively finding a next longest substring in the respective summary that is also found elsewhere in the respective document, wherein the next longest substring occurs in the respective document immediately after the preceding substring in the respective summary;
        upon finding the longest substring and each of the next longest, adding the respective document to a plurality of training documents in association with the respective summary;
    using the plurality of training documents to train a natural language model;
    identifying a first document for summarization;
    inputting the first document into the natural language model, wherein the natural language model is configured to summarize the first document using words from a first dictionary compiled based on tokens from the first document; and
    receiving a first summary output by the natural language model after the natural language model summarizes the first document.

2. The method of claim 1, wherein the tokens comprise complete words and wherein the first dictionary compiled based on the tokens comprises a dictionary that includes only the words in the first document.

3. The method of claim 1, wherein the tokens comprise strings of characters of minimum length while still having meaning to the natural language model and wherein the first dictionary compiled based on the tokens comprises a dictionary that includes only words that can be derived from the tokens.

4. The method of claim 3, wherein the words that can be derived from the tokens include the words in the first document, alternative forms of the words in the first documents, synonyms of the words in the first document, and aphorisms of the words in the first document.

5. The method of claim 1, wherein each of the plurality of substrings include complete words from the summary.

6. The method of claim 1, wherein using the plurality of training documents to train the natural language model comprises:
    inputting a first training document of the plurality of training documents into the natural language model;
    indicating to the natural language model that an answer to a blank first question is the longest substring in a summary of the first training document and adding the longest substring to a next question; and
    until the end of the summary of the first training document is reached, iteratively indicating to the natural language model that an answer to the next question is the next longest substring in the summary of the first training document and adding the next longest substring to the next question.

7. The method of claim 6, wherein the end of the summary of the first training document is reached, the answer to the next question is a special character.

8. The method of claim 6, further comprising:
    after using the plurality of training documents to train the natural language model, instructing the natural language model to summarize the first document by providing the natural language model with a blank second question.

9. The method of claim 1, wherein the first summary comprises a title for the first document.

10. A apparatus for summarizing documents, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
        obtain a plurality of documents, each including a respective summary thereof, and for each respective document of the plurality of documents:
            find a longest substring, wherein the longest substring starts at the beginning of the respective summary, in a plurality of substrings that comprise the respective summary of the respective document that is also found elsewhere in the respective document;
            until the end of the respective summary is reached, iteratively find a next longest substring in the respective summary that is also found elsewhere in the respective document, wherein the next longest substring occurs in the respective document immediately after the preceding substring in the respective summary;
            upon finding the longest substring and each of the next longest, add the respective document to a plurality of training documents in association with the respective summary; and
        use the plurality of training documents to train a natural language model;
        identify a first document for summarization;
        input the first document into the natural language model, wherein the natural language model is configured to summarize the first document using words from a first dictionary compiled based on tokens from the first document; and
        receive a first summary output by the natural language model after the natural language model summarizes the first document.

11. The apparatus of claim 10, wherein the tokens comprise complete words and wherein the first dictionary compiled based on the tokens comprises a dictionary that includes only the words in the first document.

12. The apparatus of claim 10, wherein the tokens comprise strings of characters of minimum length while still having meaning to the natural language model and wherein the first dictionary compiled based on the tokens comprises a dictionary that includes only words that can be derived from the tokens.

13. The apparatus of claim 12, wherein the words that can be derived from the tokens include the words in the first document, alternative forms of the words in the first documents, synonyms of the words in the first document, and aphorisms of the words in the first document.

14. The apparatus of claim 10, wherein each of the plurality of sub strings include complete words from the summary.

15. The apparatus of claim 10, wherein to use the plurality of training documents to train the natural language model, the program instructions direct the processing system to:
input a first training document of the plurality of training documents into the natural language model;
indicate to the natural language model that an answer to a blank first question is the longest substring in a summary of the first training document and adding the longest substring to a next question; and
until the end of the summary of the first training document is reached, iteratively indicate to the natural language model that an answer to the next question is the next longest substring in the summary of the first training document and adding the next longest substring to the next question.

16. The apparatus of claim 15, wherein the end of the summary of the first training document is reached, the answer to the next question is a special character.

17. The apparatus of claim 15, wherein the program instructions further direct the processing system to:
after the plurality of training documents are used to train the natural language model, instruct the natural language model to summarize the first document by providing the natural language model with a blank second question.

18. One or more computer readable storage media having program instructions stored thereon for summarizing documents, the program instructions, when read and executed by a processing system, direct the processing system to:
obtain a plurality of documents, each including a respective summary thereof, and for each respective document of the plurality of documents:
find a longest substring, wherein the longest substring starts at the beginning of the respective summary, in a plurality of substrings that comprise the respective summary of the respective document that is also found elsewhere in the respective document;
until the end of the respective summary is reached, iteratively find a next longest substring in the respective summary that is also found elsewhere in the respective document, wherein the next longest substring occurs in the respective document immediately after the preceding substring in the respective summary;
upon finding the longest substring and each of the next longest, add the respective document to a plurality of training documents in association with the respective summary; and
use the plurality of training documents to train a natural language model;
identify a first document for summarization;
input the first document into a natural language model, wherein the natural language model is configured to summarize the first document using words from a first dictionary compiled based on tokens from the first document; and
receive a first summary output by the natural language model after the natural language model summarizes the first document.

* * * * *